US012503292B2

(12) United States Patent
Pritchett, Jr. et al.

(10) Patent No.: US 12,503,292 B2
(45) Date of Patent: Dec. 23, 2025

(54) VARIABLE DISPLACEMENT BASE AND CONTAINER AND METHOD OF USING THE SAME

(71) Applicant: CO2PAC Limited, Auckland (NZ)

(72) Inventors: Raymond A Pritchett, Jr., Mt. Wolf, PA (US); Willie F. Hatcher, Hanover, PA (US); Michael T. Kelly, Manchester, PA (US)

(73) Assignee: CO2PAC LIMITED, Auckland (NZ)

( * ) Notice: Subject to any disclaimer, the term of this patent is extended or adjusted under 35 U.S.C. 154(b) by 120 days.

(21) Appl. No.: 18/403,059

(22) Filed: Jan. 3, 2024

(65) Prior Publication Data

US 2024/0132267 A1 Apr. 25, 2024

Related U.S. Application Data

(63) Continuation of application No. 17/889,925, filed on Aug. 17, 2022, now Pat. No. 11,905,095, which is a (Continued)

(51) Int. Cl.

*B65D 79/00* (2006.01)
*B65D 1/02* (2006.01)
*B67C 7/00* (2006.01)

(52) U.S. Cl.

CPC ....... *B65D 79/0081* (2020.05); *B65D 1/0276* (2013.01); *B67C 7/00* (2013.01); *B65D 2501/0036* (2013.01)

(58) Field of Classification Search

CPC .............. B65D 79/005; B65D 79/0081; B65D 79/008; B65D 1/0276; B65D 1/0621; (Continued)

(56) References Cited

U.S. PATENT DOCUMENTS

| | | | |
|---|---|---|---|
| 3,152,710 | A | 10/1964 | Platte |
| 3,693,828 | A | 9/1972 | Kneusel et al. |

(Continued)

FOREIGN PATENT DOCUMENTS

| | | | |
|---|---|---|---|
| CA | 2808996 | A1 | 3/2012 |
| FR | 2998877 | A1 | 6/2014 |

(Continued)

OTHER PUBLICATIONS

International Search Report and Written Opinion mailed Oct. 26, 2018 for International Application No. PCT/US2018/047755.

(Continued)

*Primary Examiner* — Robert J Hicks
(74) *Attorney, Agent, or Firm* — Armstrong Teasdale LLP

(57) ABSTRACT

Hot-fillable plastic bottle including a finished portion, a body portion with at least one circumferential rib configured to resist radial distortion, and a base portion. The base portion comprises a base sidewall, a bottom support surface extending radially inward from the base sidewall and defining a reference plane, an inner support wall extending upwardly from the bottom support surface, and a diaphragm extending radially inward from the inner support wall. The diaphragm comprises an inner wall having an arcuate shape with a radius r1 and a central conical structure, where the diaphragm is in an initial as-formed position with the conical structure above the reference place. The diaphragm is configured to move from an initial as-formed position toward a second position when an internal pressure relative an external pressure exceeds a threshold value.

20 Claims, 7 Drawing Sheets

Related U.S. Application Data continuation of application No. 17/013,163, filed on Sep. 4, 2020, now Pat. No. 11,420,803, which is a continuation of application No. 16/110,735, filed on Aug. 23, 2018, now Pat. No. 10,766,683.

(60) Provisional application No. 62/550,493, filed on Aug. 25, 2017.

(58) Field of Classification Search

CPC .......... B65D 1/0223; B65D 2501/0036; B65D 2501/0018; B65D 2501/0027; B65D 1/0261; B67C 7/00

USPC ............... 215/376, 373, 372, 371, 384, 382; 220/624, 623, 629, 628, 609, 608, 604, 220/675, 669; D9/738, 502, 516

See application file for complete search history.

(56) References Cited

U.S. PATENT DOCUMENTS

| | | | |
|---|---|---|---|
| 3,718,229 | A | 2/1973 | Wyeth et al. |
| 3,722,726 | A | 3/1973 | Carmichael et al. |
| 3,942,673 | A | 3/1976 | Lyu et al. |
| 4,151,927 | A | 5/1979 | Cvacho et al. |
| 5,139,162 | A | 8/1992 | Young et al. |
| 5,593,063 | A | 1/1997 | Claydon et al. |
| 6,065,624 | A | 5/2000 | Steinke |
| 6,176,382 | B1 | 1/2001 | Bazlur Rashid |
| 6,585,123 | B1 | 7/2003 | Pedmo et al. |
| 8,127,955 | B2 | 3/2012 | Denner et al. |
| 8,353,415 | B2 | 1/2013 | Saito et al. |
| 8,381,940 | B2 | 2/2013 | Melrose et al. |
| 2003/0221987 | A1 | 12/2003 | Trude |
| 2006/0138074 | A1 | 6/2006 | Melrose |
| 2007/0084821 | A1 | 4/2007 | Bysick et al. |
| 2007/0215571 | A1 | 9/2007 | Trude |
| 2008/0047964 | A1 | 2/2008 | Melrose et al. |
| 2009/0090728 | A1 | 4/2009 | Trude et al. |
| 2009/0159556 | A1 | 6/2009 | Patcheak et al. |
| 2009/0242575 | A1 | 10/2009 | Kamineni et al. |
| 2010/0163513 | A1 | 7/2010 | Pedmo |
| 2010/0219152 | A1 | 9/2010 | Derrien et al. |
| 2011/0017700 | A1 | 1/2011 | Patcheak et al. |
| 2011/0049083 | A1 | 3/2011 | Scott et al. |
| 2012/0248060 | A1 | 10/2012 | Saito et al. |
| 2013/0001235 | A1 | 1/2013 | Patcheak et al. |
| 2014/0209558 | A1 | 7/2014 | Wright et al. |
| 2015/0298848 | A1 | 10/2015 | Hermel |
| 2016/0176605 | A1 | 6/2016 | Pritchett et al. |
| 2017/0267391 | A1 | 9/2017 | Mast et al. |
| 2017/0267392 | A1* | 9/2017 | Woloszyk ............ B65D 1/0276 |
| 2018/0162579 | A1 | 6/2018 | Kado et al. |
| 2018/0215494 | A1 | 8/2018 | Denner et al. |
| 2019/0071209 | A1 | 3/2019 | Peykoff et al. |

FOREIGN PATENT DOCUMENTS

| | | | |
|---|---|---|---|
| JP | 2007269392 | A | 10/2007 |
| JP | 2012111546 | A | 6/2012 |
| WO | 2013025463 | A1 | 2/2013 |
| WO | 2013180032 | A1 | 12/2013 |
| WO | 2016060680 | A1 | 4/2016 |

OTHER PUBLICATIONS

International Search Report mailed Jul. 13, 2015 for International Application No. PCT/US2014/061096.

International Search Report mailed May 13, 2014 for International Application No. PCT/US2014/011433.

Supplementary European Search Report mailed Sep. 16, 2016 for Application No. EP 14741125.0.

* cited by examiner

VARIABLE DISPLACEMENT BASE AND CONTAINER AND METHOD OF USING THE SAME

CROSS REFERENCE TO RELATED APPLICATIONS

The present application is a continuation application of U.S. patent application Ser. No. 17/889,925 filed on Aug. 17, 2022, which is a continuation of U.S. patent application Ser. No. 17/013,163, filed on Sep. 4, 2020 that issued on Aug. 23, 2022 as U.S. Pat. No. 11,420,803, which is a continuation application of U.S. patent application Ser. No. 16/110,735, filed on Aug. 23, 2018 that issued on Sep. 8, 2020 as U.S. Pat. No. 10,766,683, which claims priority to U.S. Provisional Patent Application Ser. No. 62/550,493, filed on Aug. 25, 2017, all of which are hereby incorporated by reference in their entirety.

BACKGROUND

Field of the Disclosed Subject Matter

The present disclosed subject matter relates base configurations for plastic containers, as well as containers having such base configurations, and making and using the same. For example, the disclosed subject matter includes plastic containers having base portions constructed and operative to accommodate internal pressures within the container, such as due to elevated temperature processing including hot-filling, pasteurization, and/or retort processing.

Description of Related Art

Plastic containers, used for filling with beverages, juices, sauces, etc., often are hot-filled and then cooled to room temperature or below for distribution. During the process of hot-filling and quenching, the container is subjected to different thermal and pressure scenarios that can cause deformation, which may make the container non-functional or visually unsatisfactory. Functional improvements can be incorporated to the container design to accommodate for different thermal effects and pressures (positive and negative), so as to control, reduce or eliminate unwanted deformation thus making the package both visually appealing and functional for downstream situations. Functional improvements can include vacuum panels to achieve the desired results. However, it is desirable that these functional improvements, such as vacuum panels, are minimal or hidden to achieve a specific shape, look or feel that is more appealing to the consumer. Additional requirements may also include the ability to make the container lighter in weight but maintain an equivalent level of functionality and performance through the entire hot-fill and distribution process.

Existing or current technologies such as vacuum panels on a sidewall of a container may not be satisfactory from a look and feel perspective. Vacuum panels rely on different components to function efficiently and effectively. One of the major components of the efficiency includes the area in which the deformation to internal pressure changes are controlled and/or hidden. One method of hiding a vacuum panel is using a container label, which can cover the vacuum panel, but creates an undesirable void between the label and the vacuum panel. Likewise, techniques that incorporate a vacuum panel in the base portion are generally limited by surface area of the container and therefore the efficiency and effectiveness of the base panel must be enhanced to be suitable. Thus there is a need to develop a base with specific surface geometries that utilize the limited base area to provide satisfactory compensation and control of pressure-inducing deformation.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, a hot-fillable plastic bottle is provided, including a finished portion defining an opening. The hot-fillable plastic bottle further includes a body portion disposed below the finished portion and defines a central longitudinal axis. The body portion comprises a body sidewall defining an interior, the body sidewall has at least one circumferential rib extending about its circumference and is configured to resist radial distortion. The hot-fillable plastic bottle further includes a base portion disposed below the body portion. The base portion comprises a base sidewall, a bottom support surface extending radially inward from the base sidewall toward the central longitudinal axis and defines a reference plane, an inner support wall extending upwardly from the bottom support surface, and a diaphragm extending radially inward toward the central longitudinal axis from a the inner support wall. The diaphragm comprising an inner wall having an arcuate shape in a side cross-section with a radius r1 and a central conical structure, wherein the diaphragm is in an initial as-formed position with the conical structure above the reference place. The diaphragm is configured to move from the initial as-formed position toward a second position when an internal pressure relative an external pressure external of the bottle exceeds a threshold value.

As embodied herein, the arcuate shape of the inner wall can be concave relative to the reference plane in the initial as-formed position. The inner wall can consist essentially of the concave arcuate shape in a side cross-section.

As embodied herein, the bottle can be configured to contain between about 32 fluid ounces and about 64 fluid ounces when the diaphragm is in the initial as-formed position.

As embodied herein, the body sidewall can have a diameter in plan view between about 3.5 inches and about 5.5 inches.

In addition, the bottle can comprise a bottom bumper disposed between the body portion and the base portion. The bottom bumper can have a diameter in plan view greater than the diameter of the body sidewall.

As embodied herein, the inner support wall can extend upwardly a height of between about 0.01 inches and about 0.1 inches from the reference plane. For example, the inner support wall can extend upwardly a height of about 0.04 inches from the reference plane. The inner support wall can have a diameter in plan view of between about 2.5 inches and about 5 inches.

As embodied herein, the inner wall can extend radially inward a distance of between about 0.3 inches and about 1 inch from the inner support wall. The radius r1 of the inner wall can be between about 1.25 inches and about 1.75 inches. For example, the radius r1 can be about 1.5 inches. The arcuate shape of the inner wall can have a peak height between about 0.01 inches and about 0.1 inches above the reference plane.

Additionally, the inner wall can be coupled to the conical structure at a circumferential bottom edge of the conical structure. The circumferential bottom edge can have an arcuate shape in cross-sectional side view with a radius r2. Radius r2 can be between about 0.01 inches and about 0.3 inches. For example, radius r2 can be about 0.1 inches. The circumferential bottom edge can be disposed above the reference plane a distance between about 0.01 inches and about 0.1 inches when the diaphragm is in the initial as-formed position.

Furthermore, the circumferential bottom edge can be disposed below the reference plane a distance between about 0.01 inches and about 0.2 inches when in the second position.

As embodied herein, the bottle can be configured to increase in volume between the initial as-formed position and the second position of between about 3 percent and 7 percent.

As embodied herein, the bottle can be configured to contain about 33.5 fluid ounces to about 67.3 fluid ounces when the diaphragm is in the second position.

As embodied herein, the inner wall can be substantially straight in the cross-sectional side view when in the second position.

In accordance with another aspect of the disclosed subject matter, a method of hot-filling a plastic bottle is provided, including providing a plastic bottle comprising a finished portion defining an opening, a body portion disposed below the finished portion and defining a central longitudinal axis. The body portion comprises a body sidewall defining an interior and has at least one circumferential rib extending about its circumference. The bottle further includes a base portion disposed below the body portion. The base portion comprises a base sidewall, a bottom support surface extending radially inward from the base sidewall toward the central longitudinal axis and defining a reference plane, an inner support wall extending upwardly from the bottom support surface, and a diaphragm extending radially inward toward the central longitudinal axis from the inner support wall. The diaphragm comprises an inner wall having an arcuate shape in a side cross-section with a radius r1 and a central conical structure, wherein the diaphragm is in an initial as-formed position with the conical structure above the reference plane. The method further includes filling a portion of the bottle with a hot-fill liquid having a temperature above an ambient temperature and sealing the opening, wherein the diaphragm moves from the initial as-formed position toward a second position when an internal pressure of the sealed bottle relative an external pressure external of the sealed bottle exceeds a threshold value.

As embodied herein, the arcuate shape of the inner wall can be concave relative the reference plane in the initial as-formed position. For example, the inner wall can consist essentially of the concave arcuate shape in side cross section.

As embodied herein, at least a portion of the diaphragm can extend below the reference plane in the second position.

As embodied herein, the hot-filled liquid can be above ambient pressure prior to filling the portion of the bottle.

As embodied herein, the diaphragm can move from the second position at least to the initial as-formed position when the internal pressure relative the external pressure is below threshold value.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

DETAILED DESCRIPTION OF THE PREFERRED EMBODIMENT

Figure 1:
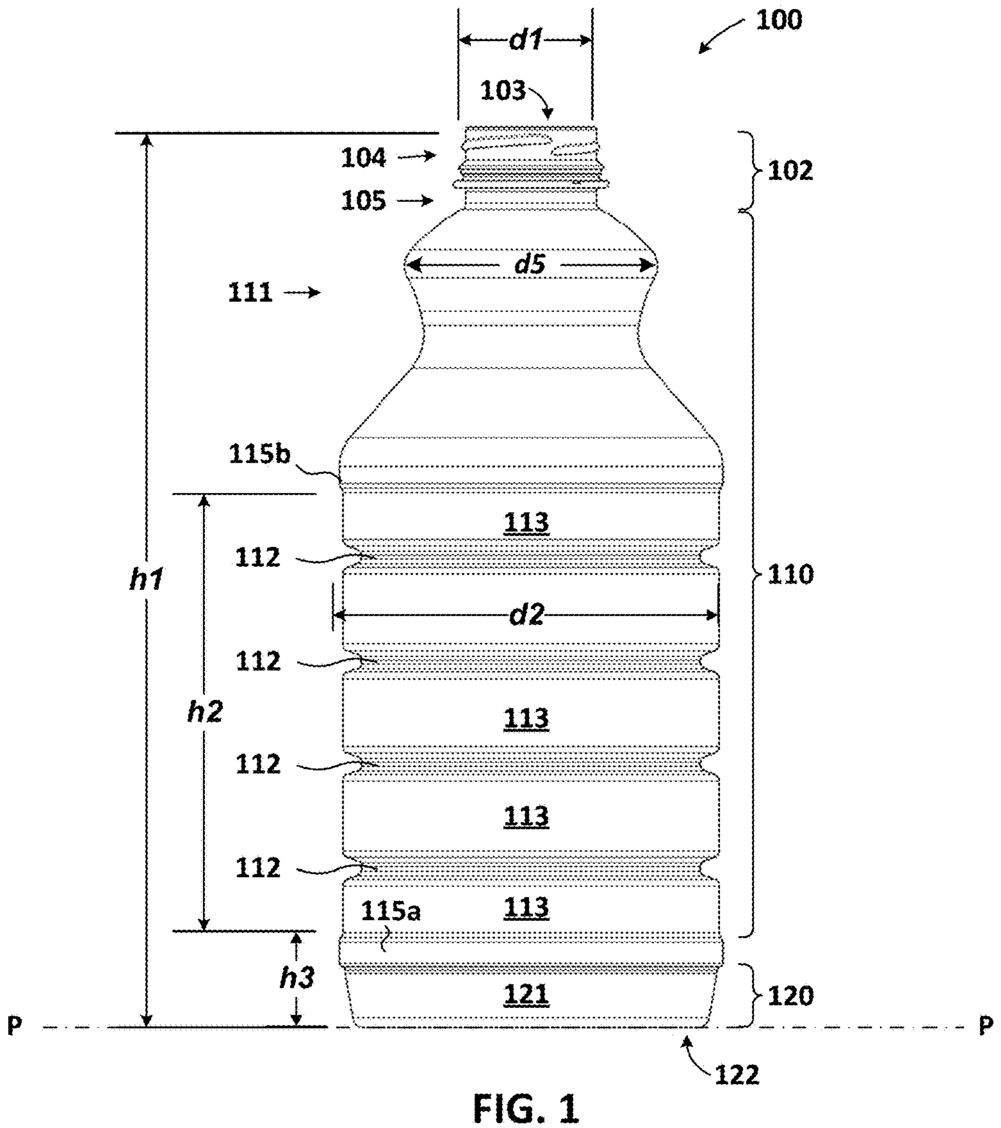
FIG. 1 is side view of an exemplary hot-fillable plastic bottle according to the disclosed subject matter.

The base configuration and methods presented herein may be used for containers, including plastic containers, such as plastic containers for liquids. The disclosed subject matter generally is directed to a base configuration reactive to internal pressure variations such as arising from elevated temperature processing, including hot-filling, pasteurization and/or retort processing. The containers and bases described herein can be formed from materials including, but not limited to, polyethylene terephthalate (PET), polyethylene naphthalate (PEN) and PEN-blends, polypropylene (PP), high-density polyethylene (HDPE), and can also include monolayer blended scavengers or other catalytic scavengers as well as multi-layer structures including discrete layers of a barrier material, such as nylon or ethylene vinyl alcohol (EVOH) or other oxygen scavengers.

In accordance with the disclosed subject matter a hot-fillable plastic bottle is provided, a finished portion defining an opening. The hot-fillable plastic bottle further includes a body portion disposed below the finished portion and defines a central longitudinal axis. The body portion comprises a body sidewall defining an interior, the body sidewall has at least one circumferential rib extending about its circumference and is configured to resist radial distortion. The hot-fillable plastic bottle further includes a base portion disposed below the body portion. The base portion comprises a base sidewall, a bottom support surface extending radially inward from the base sidewall toward the central longitudinal axis and defines a reference plane, an inner support wall extending upwardly from the bottom support surface, and a diaphragm extending radially inward toward the central longitudinal axis from a the inner support wall. The diaphragm comprising an inner wall having an arcuate shape in a side cross-section with a radius r1 and a central conical structure, wherein the diaphragm is in an initial as-formed position with the conical structure above the reference place. The diaphragm is configured to move from the initial as-formed position toward a second position when an internal pressure relative an external pressure external of the bottle exceeds a threshold value.

As disclosed herein, the diaphragm of the container can move in response to internal pressures changes within the container, such as when hot-filled or allowed to cool. In this manner, the diaphragm is configured to move downwardly in response to an increase in internal pressures, such as increased headspace pressure as gas trapped above the heated liquid increases in temperature. The diaphragm is also configured to move upwardly and axially inward in response to a decrease in internal pressure, such as the creation of an internal vacuum within the container due to cooling of the contents of a hot-fill container. Alternatively, the diaphragm is configured to restrict or resist movement in one direction but allows for less restricted movement in the opposite direction.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of the base and container with the disclosed subject matter are shown in the accompanying figures. The base is suitable for the manufacture of containers such as, bottles, jars and the like. Such containers incorporating the base can be used with a wide variety of perishable and nonperishable goods. However, for purpose of understanding, reference will be made to the use of the base for a container disclosed herein with liquid or semi-liquid products such as sodas, juices, sports drinks, energy drinks, teas, coffees, sauces, dips, jams and the like, wherein the container can be filled with a hot liquid or non-contact (i.e., direct drop) filler, such as a non-pressurized filler, and further used for transporting, serving, storing, and/or re-using such products while maintaining a desired shape, including providing a support surface for standing the container on a table or other substantially flat surface. Containers having a base described herein can be further utilized for sterilization, such as retort sterilization, and pasteurization of products contained therein. As described in further detail below, the container can have a base configuration to provide improved sensitivity and controlled deformation from applied forces, for example resulting from pressurized filling, sterilization or pasteurization and resulting thermal expansion due to hot liquid contents and/or vacuum deformation due to cooling of a liquid product filled therein. The base configuration can influence controlled deformation from positive container pressure, for example resulting from expansion of liquid at increased temperatures or elevations. For purpose of illustration, and not limitation, reference will be made herein to a base and a container incorporating a base that is intended to be hot-filled with a liquid product, such as tea, sports drink, energy drink or other similar liquid product.

Plastic containers according to embodiments of the disclosed subject matter can be of any suitable size. For example, embodiments include containers with internal volumes of 32 fluid ounces, 46 fluid ounces, or 64 fluid ounces. Also, container sizes can include single-serving and multiple-serving size containers.

Hot-fill processing can include filling a product into the container at any temperature in a range of at or about 130° F. to at or about 205° F. or in a range of at or about 185° F. to at or about 205° F. For example, a 64 ounce bottle can be filled with a hot product at a temperature of at or about 185° F. As needed, the hot-fill temperature can be above 205° F.

Plastic containers according to embodiments of the disclosed subject matter can also optionally be subjected to through processing, such as pasteurization and/or retort processing. Additionally or alternatively, hot-filling as used herein can include heating contents subsequent to filling, for example.

Pasteurization can involve heating a filled and sealed container and/or the product therein to any temperature in the range of at or about 200° F. to at or about 215° F. or at or about 218° F. for any time period at or about five minutes to at or about forty minutes, for instance. In various embodiments, a hot rain spray may be used to heat the container and its contents.

Retort processing for food products, for instance, can involve heating a filled and sealed container and/or the product therein to any temperature in the range of at or about 230° F. to at or about 270° F. for any time period at or about twenty minutes to at or about forty minutes, for instance. Overpressure also may be applied to the container by any suitable means, such as a pressure chamber to control the pressure differential between the interior and exterior of the container during processing.

Figure 9:
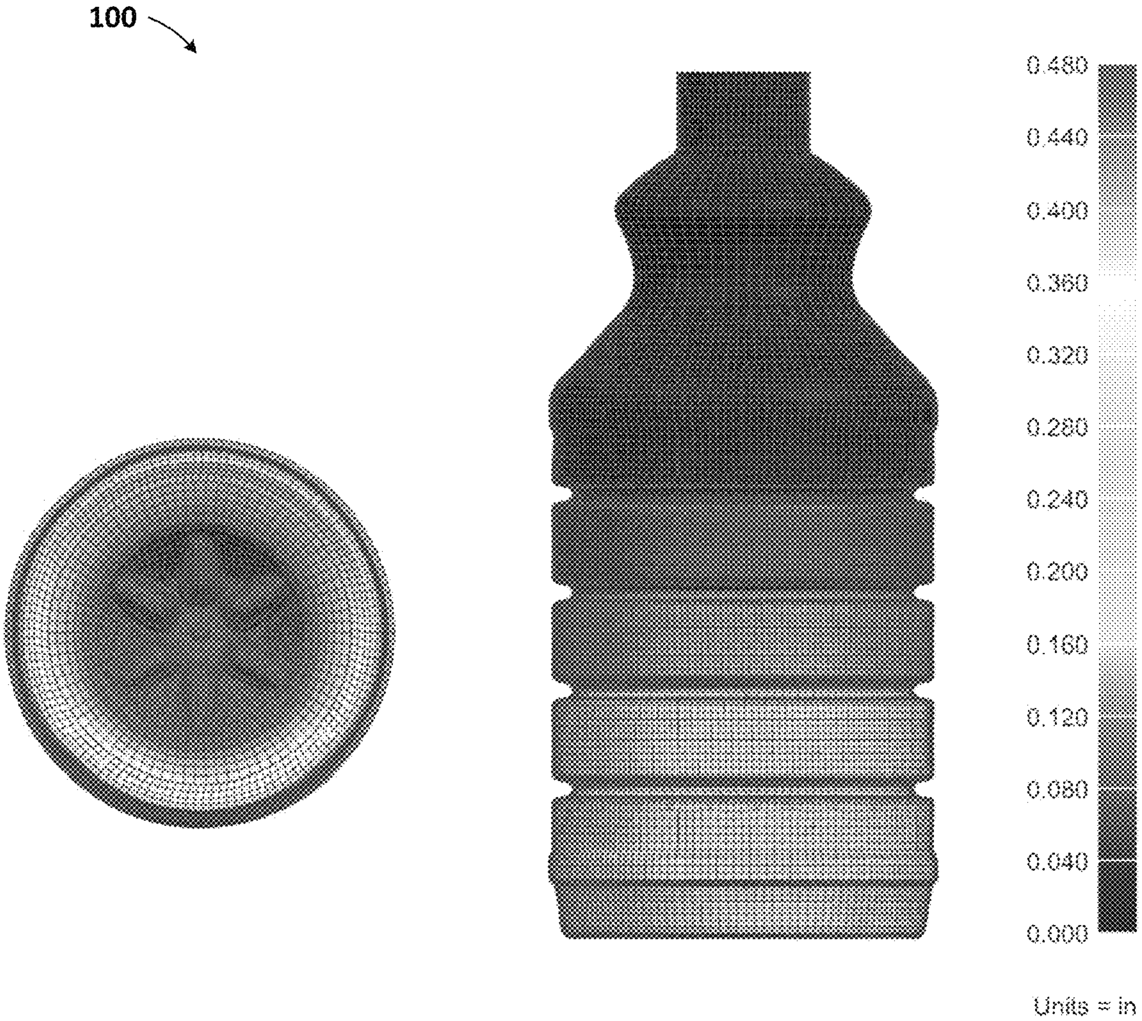
FIG. 9 is a finite element model of an exemplary embodiment of the hot-fillable plastic bottle of FIG. 1 with areas of strain highlighted to show strain in the bottle and increased strain isolated in the diaphragm.
Figure 10:
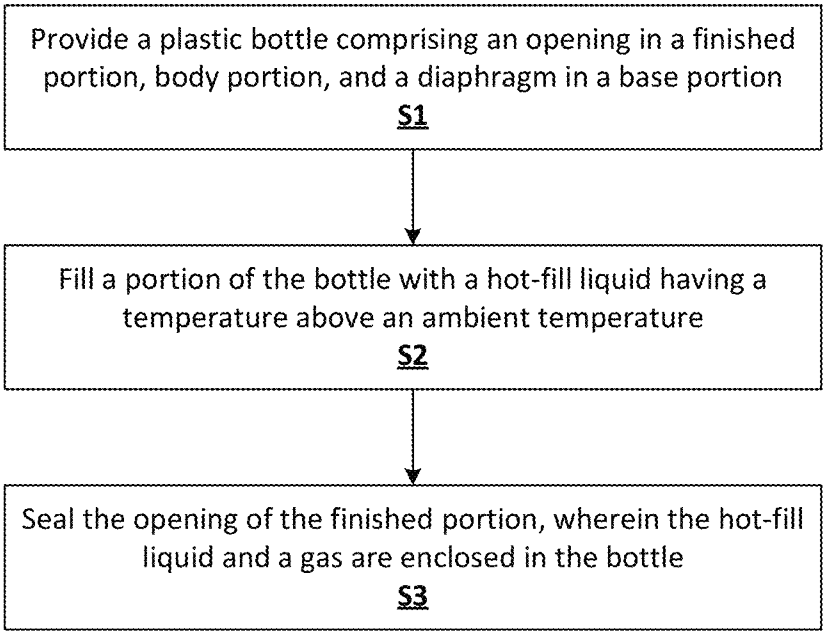
FIG. 10 is an operational flowchart generally depicting the method of the exemplary hot-filling the bottle of FIG. 1 according to the disclosed subject matter.

Reference will now be made in detail to the various exemplary embodiments of the disclosed subject matter, exemplary embodiments of which are illustrated in the accompanying drawings. For purpose of explanation and illustration, and not limitation, FIGS. 1-10 illustrate various aspects of the disclosed subject matter. FIGS. 1-4 illustrate a hot-fillable plastic bottle in an initial as-formed position; FIGS. 5-8 illustrate the bottle with the diaphragm in a second position with an internal pressure above a threshold value; FIG. 9 illustrates a finite element analysis (FEA) of the bottle of FIG. 1 to demonstrate strain controlled to the base; and FIG. 10 illustrates an operational flowchart generally depicting the method of hot-filling the bottle, according to aspects of the disclosed subject matter.

Referring now to FIG. 1, a side view of a hot-fillable plastic bottle 100 is provided. For example, and as embodied herein, bottle 100 is configured to undergo elevated temperature processing, such as hot-filling, pasteurization, and/or retort processing and also configured to undergo cooling processing or cool-down operations. Bottle 100 is further configured to accommodate or react in a certain manner to any of the aforementioned forces or pressures. For example, bottle 100 is structurally configured to accommodate a hot-filling and cooling process without mechanical action, as will be discussed further below.

According to the disclosed subject matter, and as embodied herein, bottle 100 can be any suitable size, for example, bottle 100 can include internal volumes of between about 32 fluid ounces and about 64 fluid ounces. Furthermore, bottle 100 can have a bottle height h1 between about 7.5 inches and about 10.5 inches, however, other sizes and dimensions are also contemplated. Bottle 100 can be formed from any suitable materials including, but not limited to, polyethylene terephthalate (PET), polyethylene naphthalate (PEN) and PEN-blends, polypropylene (PP), high-density polyethylene (HDPE), and can also include monolayer blended scavengers or other catalytic scavengers as well as multi-layer structures including discrete layers of a barrier material, such as nylon or ethylene vinyl alcohol (EVOH) or other oxygen scavengers.

As embodied herein, bottle 100 includes a finished portion 102, a body portion 110, and a base portion 120. The finished portion 102 defines an opening 103. According to aspects of the disclosed subject matter, and as embodied herein, the opening 103 can be capped or sealed using any suitable closure (not shown) such as a plastic or metallic threaded cap or lid, a foil seal, a lug closure, a plastic or metallic snap-fit lid or cap. For example, finished portion 102 can include a threaded portion 104 configured to receive a plastic or metallic threaded cap or lid. Finished portion 102 can have any suitable diameter d1 in plan view, for example, about 1 inch and about 2 inches.

Additionally, the finished portion can include a collar 105 with a diameter similar to diameter d1. Collar 105 can be used as a means of harnessing and supporting the bottle 100 during a hot-fill process, where the base portion 120 is suspended freely above a surface. For example, when the base portion 120 is suspended, the specific process and geometries are configured to achieve downward deflection due to internal pressures, as will be discussed further below.

As embodied herein, the body portion 110 is disposed below the finished portion 102 and defines a central longitudinal axis. For example, the body portion 110 can comprise a shoulder 111 and a body sidewall 113 defining an interior. Furthermore, the body sidewall 113 can include at least one circumferential rib 112 configured to restrict or resist radial distortion. For example, and as embodied herein, body sidewall 113 can include a plurality of circumferential ribs 112, each circumscribing body sidewall 113. Each circumferential rib 112 is configured to restrict or resist radial distortion, such as paneling, denting, barreling, ovalization, and/or other unwanted deformation of body sidewall 113 during elevated temperature processing, such as hot-filling, pasteurization, and/or retort processing. The circumferential ribs 112 can also aid in enhanced axial and top loads. The dimensions and profile of each circumferential rib 112 can be selected as desired for intended use. For example, as embodied herein, the circumferential ribs 112 are provided, each with a concave profile relative to a reference plane.

According to aspects of the disclosed subject matter, the shoulder 111 and body sidewall 113 can include any suitable dimensions and shapes. For example, body sidewall 113 can have a height h2 between about 3 inches and about 5.5 inches and a diameter d2 in a plan view between about 3.5 inches and about 4.5 inches. Additionally, shoulder 111 can include a generally hourglass shape, as show, with a top portion having a diameter d5 intermediate diameters d1 and d3.

In accordance with the disclosed subject matter, the base portion 120 is disposed below the body portion 110, and includes a base sidewall 121 and a bottom support surface 122. Base portion 120 can also be configured to accommodate changes in pressure differentials interior and exterior to the bottle, such as due to varying temperatures or atmospheric pressure in transit. These operations and benefits can be achieved by the diaphragm of the disclosed subject matter.

As disclosed herein, the base sidewall 121 can be substantially vertical, contoured in shape, and/or angled. For example, and for illustration purposes and not limitation, base sidewall 121 as embodied herein can be angled outwardly from the bottom surface. The bottom support surface 122 extends radially inward from the base sidewall 121 towards the central longitudinal axis and defines a reference plane P. As embodied herein, bottom support surface 122 can provide a continuous surface (e.g., reference plane P) to balance or stand bottle 100 on a surface such as a shelf or countertop. Additionally or alternatively, the bottom support surface can have a plurality of segments spaced about the circumference of the base part, such that reference plane P is defined by the bottom of the plurality of segments. The bottom support surface 122 can have a planar portion or be provided with a convex arcuate shape (not shown) such that a bottom tangential plane defines reference plane P.

According to further aspects of the disclosed subject matter, bottle 100 can include a bottom bumper 115*a* disposed between the body portion 110 and the base portion 120. Additionally or alternatively, bottle 100 can also include a top bumper 115*b* disposed between shoulder 111 and body sidewall 113. Bumpers 115*a* and 115*b* can define a label area between which a label, such as a wrap-around label, can be affixed to body sidewall 113. For example, each bumper can have a ring shape as shown with an outer diameter d3 greater than that of the body portion 113 or base portion 120, for example, diameter d3 in plan view can be between about 3.5 inches and about 5 inches. Furthermore, and as embodied herein, base portion 120 and bottom bumper 115*a* can have a combined height h3 between about 0.7 inches and about 1.2 inches from reference plane P.

Figure 2:
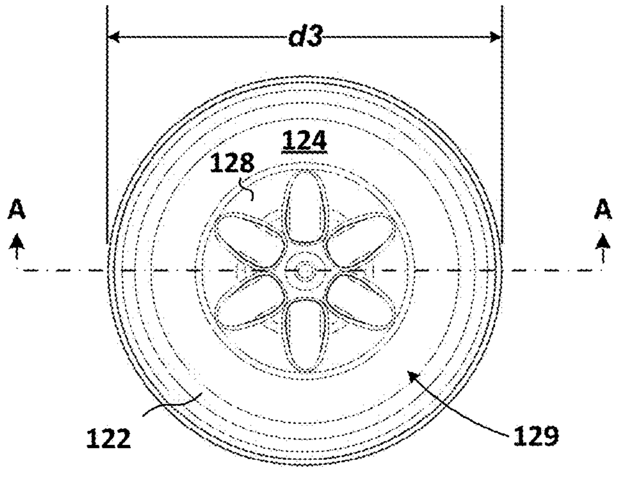
FIG. 2 is bottom view of the exemplary hot-fillable plastic bottle of FIG. 1.

Referring now to FIG. 2, which is a bottom view of the bottle 100. The diaphragm 129 includes an inner wall 123 and a conical structure 128. As embodied herein the inner wall 124 extends radially inward from the inner support wall 123 to the conical structure 128, which is aligned with the central longitudinal axis.

Figure 3:
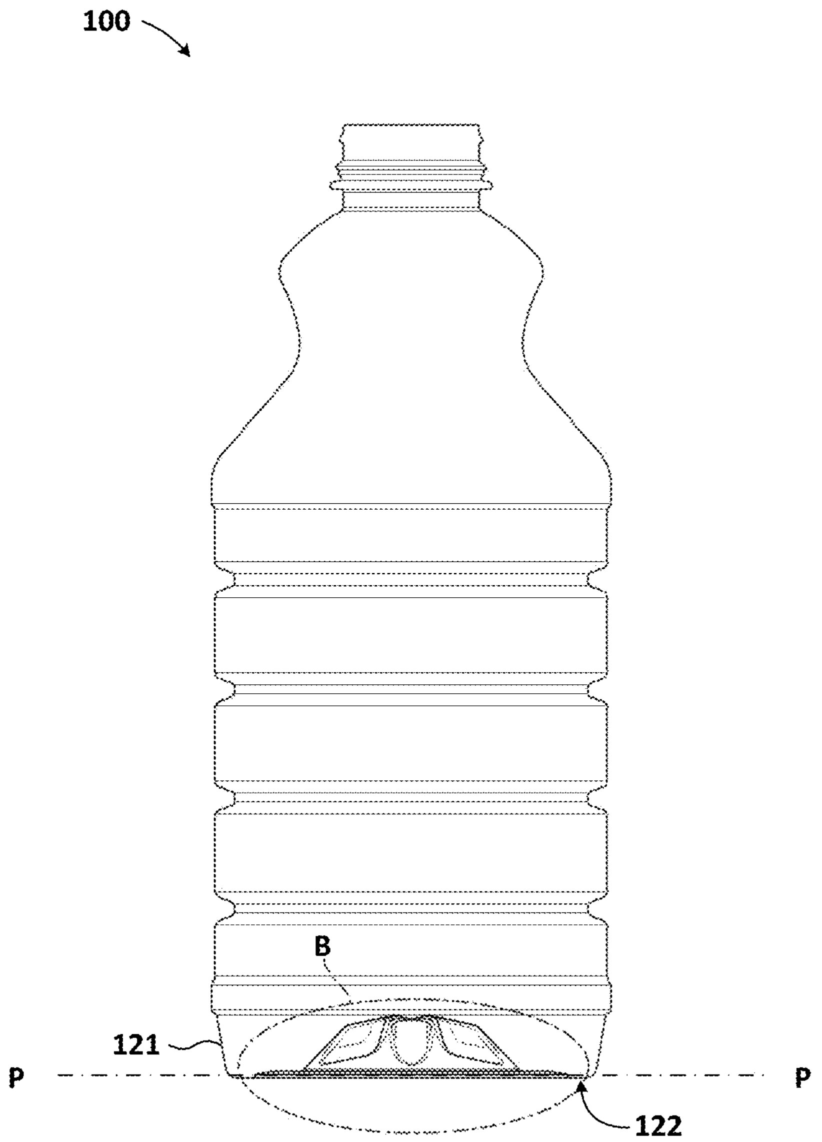
FIG. 3 is a cross-section side view of the exemplary hot-fillable plastic bottle of FIG. 1.
Figure 4:
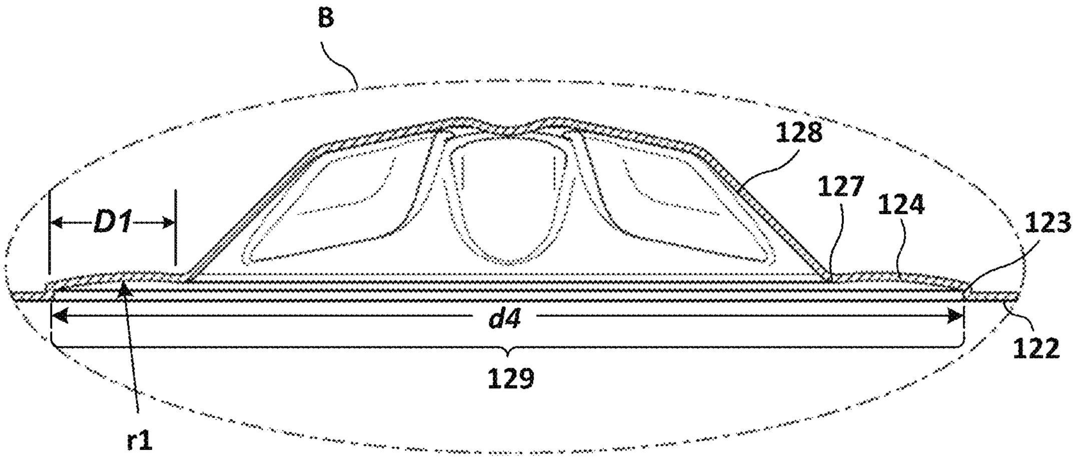
FIG. 4 is a cross-sectional detail view of part of a base portion of the exemplary hot-fillable plastic bottle of FIG. 1 with the wall thickness along the base part exaggerated for purpose of illustration.

With reference to FIGS. 3 and 4, cross-sectional views of the bottle 100 are provided for further illustration and understanding of the diaphragm 129. Particularly, FIG. 3 is a cross-sectional view of bottle 100 taken alone section line A-A of FIG. 2. FIG. 4 is a section view B of FIG. 3 depicting a portion of base portion 120, wherein the wall thickness of parts of the base portion 120 are exaggerated for reference, and the remaining wall thicknesses are omitted for clarity.

As embodied herein, the base portion 120 includes the base sidewall 121 and the bottom support surface 122 extending radially inward from the base sidewall 121 toward the central longitudinal axis and defines the reference plane P. Additionally, the base portion 120 includes an inner support wall 123 extending upwardly from the bottom support surface 122. Although not depicted, the inner support wall 123 in the aforementioned configuration can extend radially inward, for example, at an angle less than 90° from the reference plane P. Diaphragm 129 extends radially inward toward the central longitudinal axis from a hinge formed by the inner support wall 123.

The diaphragm 129 comprises the inner wall 124 and the conical structure 128. The diaphragm 129 is configured to remain substantially in the initial as-formed position with an interior pressure below a threshold value. For example, the threshold value can be any value required to displace diaphragm 129 from the initial as-formed position toward the second position.

For example, during a hot-filling process, the internal bottle pressure increases from an initial pressure when the bottle is sealed, to an elevated pressure due to, for example, heating of gases in the headspace of the sealed bottle. The base portion 120, and more specifically, the inner support wall 123 and diaphragm 129 of the disclosed subject matter, are configured to react in a controlled manner, such that the diaphragm 129 begins to move towards the second position when the internal pressure reaches the threshold value. As the internal pressure continues to increase relative to pressures external to the bottle and beyond the threshold value, for example, due to the aforementioned heating of headspace gases, the diaphragm 129 continues to move towards the second position until reaching the second position. Additionally, the diaphragm 129 is configured to move from the second position toward the initial as-formed position as the internal pressure creates a vacuum pressure relative to pressures external to the bottle, for example, during a cooling process. The geometry of the base portion 120 that contribute to the above mention diaphragm 129 movement will now be discussed according to aspects of the disclosed subject matter.

According to the disclosed subject matter, and as embodied herein, the inner support wall 123 can extend upwardly a height of between about 0.01 inches and about 0.1 inches from the reference plane P. For example, the inner support wall 123 can extend upwardly a height of about 0.4 inches from the reference plane P. The inner support wall 123 has a diameter d4 in plan view of between about 2.5 inches and about 5 inches.

Further in accordance with the disclosed subject matter, the inner wall 124 extends radially inward a distance D1 of between about 0.3 inches and about 1 inch from the inner support wall 123. The inner wall 124 can have a concave arcuate shape relative to reference line P in a cross-sectional side view with radius r1 when in the initial as-formed position. That is, the inner wall 124 can be concave relative to the reference plane P as shown, for example and not limitation, in FIG. 4. The inner wall 124 in combination with the hinge formed by the inner support wall 123 thus allow the diaphragm 129 to move from a first position to a section position in response to internal pressures relative to pressures external to the bottle 100.

Due to the geometry of the base portion 120 and parts thereof (e.g., the hinge formed by the inner support wall 123), the diaphragm 129 is free to move from the initial as-formed position to the second position due to an increase of internal pressure during the hot-fill process, as described above. For example, the internal pressure can increase during the hot-fill process due to effects of headspace. According to aspects of the disclosed subject matter, the bottle 100 can have a volume of 64 ounces, where during hot-filling, a liquid at a temperature of about 185° F. can fill about 75 percent of the bottle 100 volume leaving about 25 percent air or other gases roughly at ambient temperature in the headspace after capping. It has been found that there can be a pressure spike, for example, after about 2 minutes, such that the increased pressure is sufficient to exceed the threshold value needed to move the diaphragm 129 from the initial as-formed position to the second position. Bottle 100 can be suspended above a surface, for example, by harnessing collar 105 during a hot-fill process, as described above, such that the base portion 120 is suspended freely above a surface and the diaphragm can move to a second position below the reference plane P. As embodied herein, the threshold value can be met by the increased internal pressure caused by the pressure spike. Additionally or alternatively, the weight of the liquid on the freely suspended base portion and/or the heating and softening of the bottle walls, in combination with the bottle geometry as described herein, can contribute to the movement of the diaphragm 129 from the initial as-formed position to the second position.

The overall design and contour of the base portion 120, or portions thereof, can respond to negative internal pressure or vacuum as well as positive internal pressure. The specific geometries of diaphragm 129 can aid in concentrating and distributing axial stress.

The radius r1 can be between about 1.25 inches and about 1.75 inches. For example, radius r1 can be about 1.5 inches. The concave arcuate shape can have a peak height of between about 0.01 inches to about 0.1 inches above the reference plane P. Alternatively, the inner wall 124 can have a convex arcuate shape in a cross-sectional side view with a radius similar to r1. Furthermore, the thickness of the inner wall 124 can be between about 0.005 inches and about 0.025 inches. Particularly, the thickness of the inner wall 124 can be between about 0.0008 inches and about 0.015 inches. Alternatively, other inner wall thicknesses can be utilized to achieve different threshold values.

Further in accordance with the disclosed subject matter, the diaphragm 129 includes a conical structure 128, e.g., aligned with the longitudinal axis as embodied herein. The conical structure 128 can provide structural integrity to the diaphragm 129 and can be configured to control the extent to which the diaphragm 129 can move, for example, towards the second position during the aforementioned exemplary hot-filling process. As embodied herein, the inner wall 124 can be coupled to the conical structure 128 at a circumferential bottom edge 127 of the conical structure 128, which can meet at an angle or can have an arcuate shape, such as a concave arcuate shape relative to reference plan P. For example, circumferential bottom edge 127 can have a radius r2 as viewed in cross-section of between about 0.01 inches and about 0.3 inches, such as radius r2 of about 0.1 inches. Circumferential bottom edge 127 can be disposed above the reference plane P a distance of between about 0.01 inches and about 0.1 inches when the diaphragm 129 is in the initial as-formed position. According to aspects of the disclosed subject matter, circumferential bottom edge 127 can be configured as a second hinge during the dynamic response to pressure differentials applied to the bottle 100.

Figure 8:
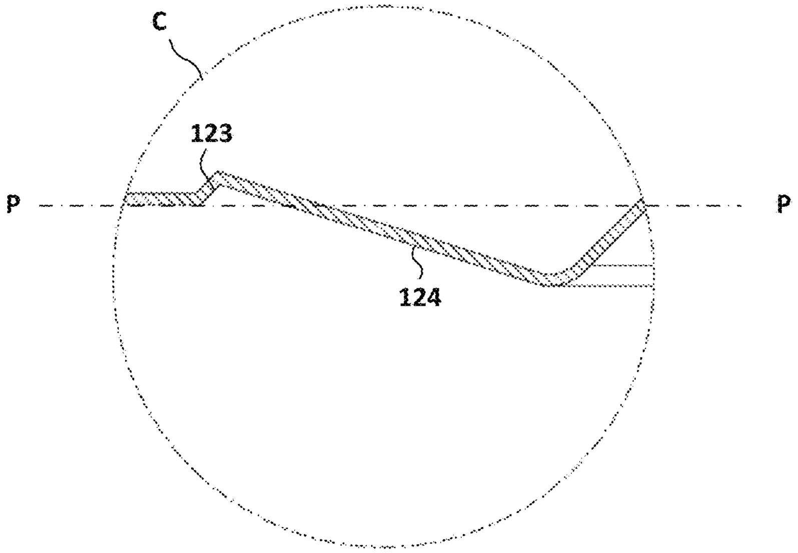
FIG. 8 is a cross-sectional detail view of the exemplary hot-fillable plastic bottle of FIG. 5 with the wall thickness along the base part exaggerated for purpose of illustration.

With reference to FIGS. 5-8, diaphragm 129 of bottle 100 is illustrated in the second position. Particularly, FIG. 9 is a partial cross-sectional view of portions of bottle 100 taken alone section line A'-A' of FIG. 8 and FIG. 10 is a section view C of FIG. 8 depicting a portion of base portion 120 in the second position. It should be noted, the wall thicknesses are exaggerated for illustrative purposes only and not limitation or representative of relative thicknesses.

Figure 5:
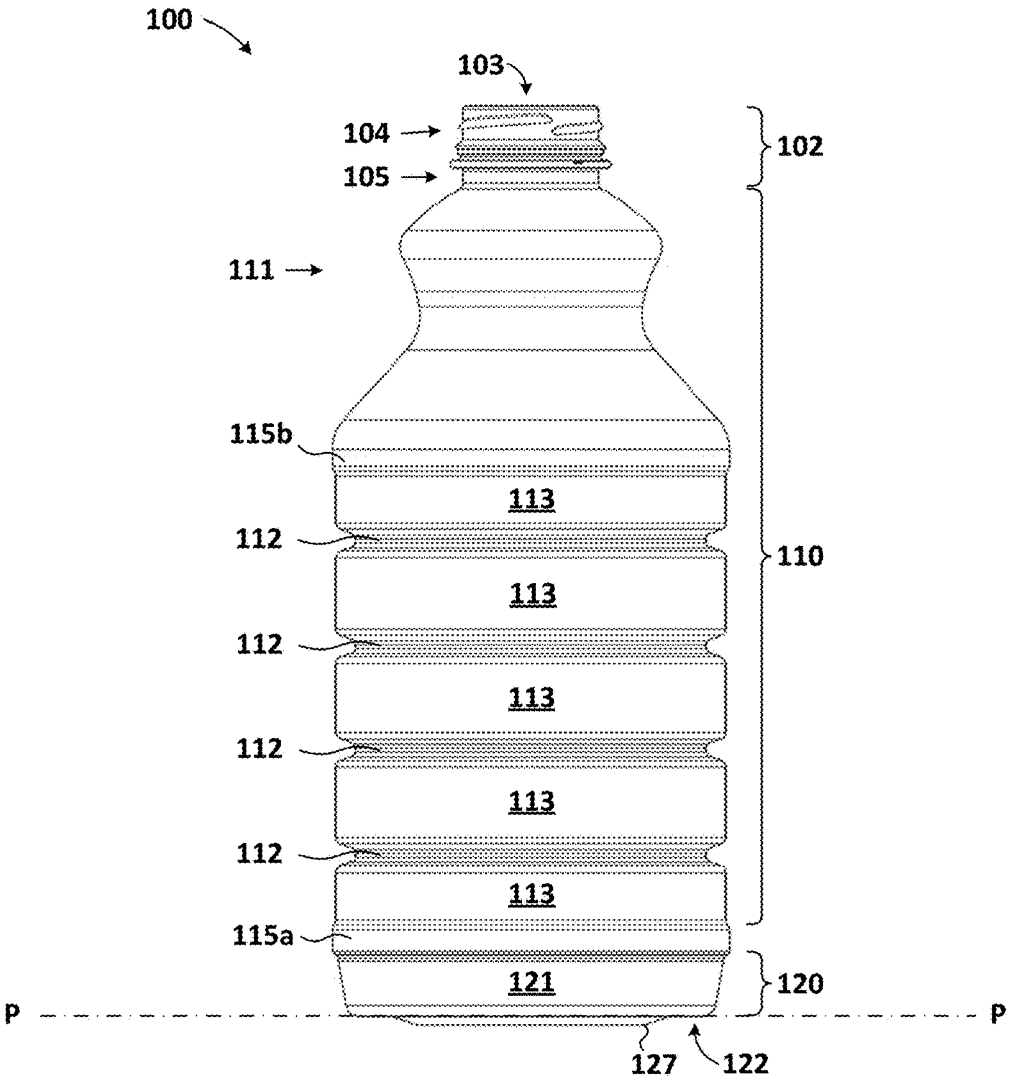
FIG. 5 is a side view of the exemplary hot-fillable plastic bottle of FIG. 1 with the diaphragm in a second position for purpose of illustration.
Figure 6:
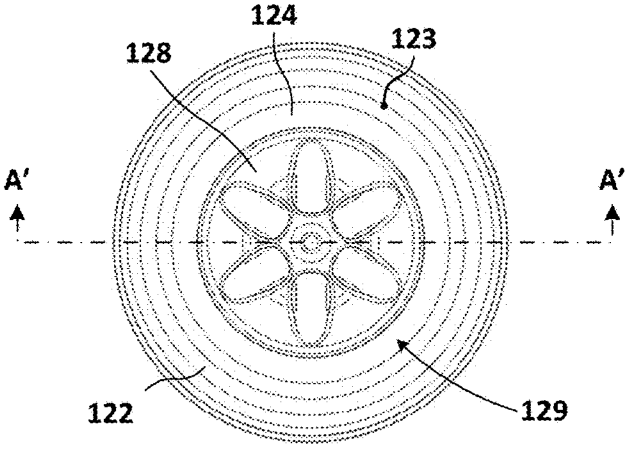
FIG. 6 is a bottom view of the exemplary hot-fillable plastic bottle of FIG. 1 with the diaphragm in the second position.
Figure 7:
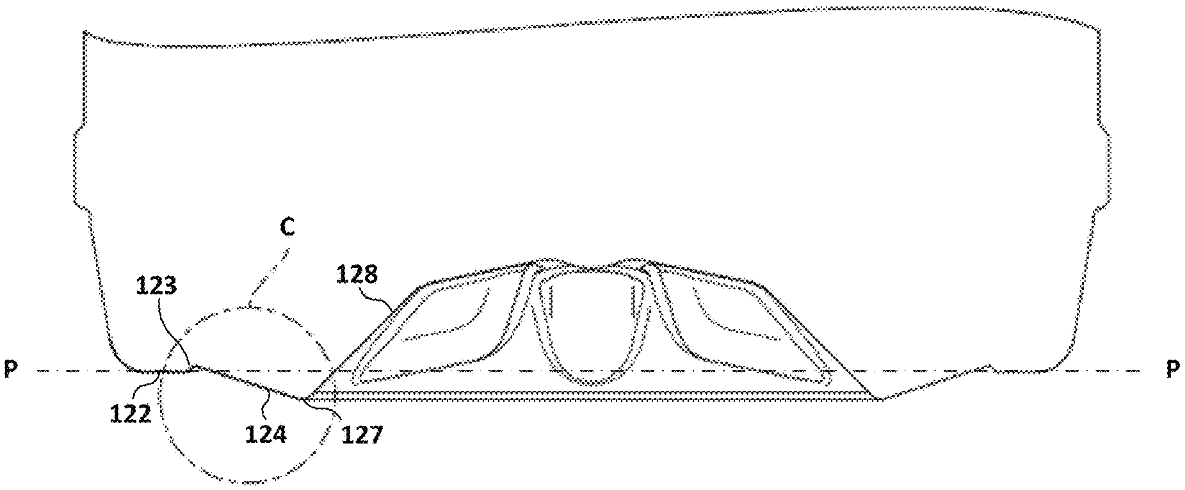
FIG. 7 is a cross-sectional detail view of a part of the base portion of the exemplary hot-fillable plastic bottle of FIG. 5.

With reference to FIGS. 5 and 6, a side view and bottom view, respectively, of bottle 100 are provided with the diaphragm in the second position.

According to the disclosed subject matter, the bottle 100 can be configured to increase in volume, between the initial as-formed position and the second position, of between about 3 percent and about 7 percent. In this manner the circumferential bottom edge 127 of the conical structure 128 can be disposed below the reference plane P a distance between about 0.01 inches and about 0.2 inches when in the second position. For example, circumferential bottom edge 127 of the conical structure 128 can be disposed below the reference plane P a distance of about 0.1 inches. Additionally, inner support wall 123 can be configured to act as a hinge to facilitate movement of the diaphragm 129 from the initial as-formed position to the second position. For example and as illustrated, inner support wall 123 can extend 900 from the reference plane P when in the initial as-formed position and at an angle less than 900 relative the reference plane P when in the second position.

Referring now to FIG. 9, bottom view and side view of bottle 100 is provided and illustrates an exemplary finite element analysis, according to aspects of the disclosed subject matter. For purpose of illustration and not limitation, a blow-simulation and vacuum analysis of a bottle is provided, wherein the vacuum and pressure results of a 64 ounce PET bottle are provided. As a result of the geometry of the base portion 120 as described above, a displacement pressure (i.e., threshold value) can be achieved at about 1.95 psi. A desired volumetric extraction amount of 77 cc can be achieved before further distortion at 96 cc. Additionally, as a result of the geometry of the base portion 120 described above, the body sidewalls 113 resisted radial distortion and resulting displacement due to vacuum pressure was concentrated in the diaphragm 129. The threshold value for other aspects of the disclose subject matter can be between about 1 psi and about 3 psi, however, any threshold value can be envisioned depending on the dimensions and structure of bottle 100.

Through testing, it was determined that the configuration of the base portion 120 as discussed herein prevented deformation in an uncontrolled manner and/or to an unrecoverable state when exposed to currently used processes and pressures. Thus, the base configuration provides a structural support response to internal positive and negative pressures caused by, for example, hot-filling and cooling.

In accordance with another aspect of the disclosed subject matter, a method of hot-filling a plastic bottle is provided, including providing a plastic bottle comprising a finished portion defining an opening, a body portion disposed below the finished portion and defining a central longitudinal axis. The body portion comprises a body sidewall defining an interior and has at least one circumferential rib extending about its circumference. The bottle further includes a base portion disposed below the body portion. The base portion comprises a base sidewall, a bottom support surface extending radially inward from the base sidewall toward the central longitudinal axis and defining a reference plane, an inner support wall extending upwardly from the bottom support surface, and a diaphragm extending radially inward toward the central longitudinal axis from the inner support wall. The diaphragm comprises an inner wall having an arcuate shape in a side cross-section with a radius r1 and a central conical structure, wherein the diaphragm is in an initial as-formed position with the conical structure above the reference plane. The method further includes filling a portion of the bottle with a hot-fill liquid having a temperature above an ambient temperature and sealing the opening, wherein the diaphragm moves from the initial as-formed position toward a second position when an internal pressure of the sealed bottle relative an external pressure external of the sealed bottle exceeds a threshold value.

Solely for the purpose of illustration, reference is now made to FIG. 10, in which an operational flowchart of a method of hot-filling the bottle 100 is provided, according to the disclosed subject matter. The method includes providing a plastic bottle (S1) comprising a finished portion 102 defining an opening 103, a body portion 110 disposed below the finished portion 102 and defining a central longitudinal axis. The body portion 110 comprises a body sidewall 113 defining an interior and has at least one circumferential rib 112 extending about its circumference. The bottle further includes a base portion 120 disposed below the body portion 110. The base portion 120 comprises a base sidewall 121, a bottom support surface 122 extending radially inward from the base sidewall 121 toward the central longitudinal axis and defining a reference plane P, an inner support wall 123 extending upwardly from the bottom support surface 122, and a diaphragm 129 extending radially inward toward the central longitudinal axis from the inner support wall. The diaphragm 129 comprises an inner wall 124 having an arcuate shape in a side cross-section with a radius r1 and a central conical structure 128, wherein the diaphragm 129 is in an initial as-formed position with the conical structure 128 above the reference plane P. The method further includes filling a portion of the bottle 100 with a hot-fill liquid (S2) having a temperature above an ambient temperature and sealing the opening (S3), wherein the diaphragm 129 moves from the initial as-formed position toward a second position when an internal pressure of the sealed bottle relative an external pressure external of the sealed bottle exceeds a threshold value.

According to aspects of the disclosed subject matter, the arcuate shape of the inner wall 124 can be concave relative the reference plane P in the initial as-formed position. For example, the inner wall 124 can consist essentially of the concave arcuate shape in side cross-section.

According to further aspects of the disclosed subject matter, at least a portion of the diaphragm 129 can extend below the reference plane P in the second position.

As embodied herein, the hot-filled liquid can be above ambient pressure prior to filling the portion of the bottle 100.

As embodied herein, the diaphragm 129 can move from the second position at least to the initial as-formed position when the internal pressure relative the external pressure is below the threshold value.

Various types of ribs, hot-fill processes, and conical structure features can also be incorporated into the disclosed subject matter. For example and not limitation, references to such additional features and details can be found in, for example, Int. Pub. No. WO 2013/025463 and U.S. Pub. No. 2014/0209558, each of which is incorporated by reference herein in its entirety.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A hot-fillable plastic bottle, the bottle comprising:

a finished portion defining an opening;

a body portion disposed below the finished portion and defining a central longitudinal axis, the body portion comprising a body sidewall defining an interior, the body sidewall having at least one circumferential rib extending about its circumference and configured to resist radial distortion; and a base portion disposed below the body portion, the base portion comprising:

a base sidewall, a bottom support surface extending radially inward from the base sidewall toward the central longitudinal axis and defining a reference plane, an inner support wall extending upwardly from the bottom support surface at an angle less than 90 degrees, and a diaphragm extending radially inward toward the central longitudinal axis from the inner support wall, the diaphragm comprising an inner wall and a central conical structure, the inner wall extending from the inner support wall to the central conical structure and including a continuous arcuate shape in a side cross section with a radius r1, wherein the diaphragm is in an initial as-formed position with the conical structure above the reference plane, the diaphragm configured to move from the initial as-formed position toward a second position when an internal pressure relative an external pressure external of the bottle exceeds a threshold value, wherein the diaphragm is configured to move downwardly in response to an increase in the internal pressure and wherein the second position is below the as-formed position, and further wherein the diaphragm is configured to move upwardly and axially inward at least to the initial as-formed position in response to a decrease in internal pressure corresponding to an internal vacuum being created within the bottle due to cooling of a hot-fill liquid provided in the bottle.

2. A method of hot-filling a plastic bottle, the method comprising:

providing a plastic bottle, the bottle comprising:

a finished portion defining an opening, a body portion disposed below the finished portion and defining a central longitudinal axis, the body portion comprising a body sidewall defining an interior, the body sidewall having at least one circumferential rib extending about its circumference, and a base portion disposed below the body portion, the base portion comprising:

a base sidewall, a bottom support surface extending radially inward from the base sidewall toward the central longitudinal axis and defining a reference plane, an inner support wall extending upwardly from the bottom support surface at an angle less than 90 degrees, and a diaphragm extending radially inward toward the central longitudinal axis from the inner support wall, the diaphragm comprising an inner wall extending from the inner support wall to a central conical structure, the inner wall including a continuous arcuate shape in a side cross section with a radius r1, wherein the diaphragm is in an initial as-formed position with the conical structure above the reference plane;

filling a portion of the bottle with a hot-fill liquid having a temperature above an ambient temperature; and sealing the opening, wherein the diaphragm moves from the initial as-formed position toward a second position when an internal pressure of the sealed bottle relative an external pressure external of the sealed bottle exceeds a threshold value, wherein the second position is below the as-formed position; and providing for a cooling of the hot-fill liquid and moving the diaphragm upwardly and axially inward at least to the initial as-formed position in response to a decrease in internal pressure.

3. The bottle of claim 1, wherein the arcuate shape of the inner wall is concave relative the reference plane in the initial as-formed position and/or the inner wall consists essentially of the concave arcuate shape in a side cross-section.

4. The bottle of claim 3, wherein the radius r1 of the concave arcuate shape of the inner wall is: between about 1.25 inches and about 1.75 inches; or of about 1.5 inches.

5. The bottle of claim 1, wherein the bottle is configured to contain between about 32 fluid ounces and about 64 fluid ounces when the diaphragm is in the initial as-formed position.

6. The bottle of claim 1, wherein the body sidewall has a diameter in plan view between about 3.5 inches and about 5.5 inches.

7. The bottle of claim 1, comprising a bottom bumper disposed between the body portion and the base portion.

8. The bottle of claim 1, wherein the inner support wall:

extends upwardly a height of: between about 0.01 inches and about 0.1 inches from the reference plane; or, about 0.04 inches from the reference plane; and/or, has a diameter in plan view of between about 2.5 inches and about 5 inches.

9. The bottle of claim 1, wherein the inner wall extends radially inward a distance of between about 0.3 inches and about 1 inch from the inner support wall.

10. The bottle of claim 1, wherein the arcuate shape has a peak height of between about 0.01 inches and about 0.1 inches above the reference plane.

11. The bottle of claim 1, wherein the inner wall is coupled to the conical structure at a circumferential bottom edge of the conical structure.

12. The bottle of claim 11, wherein the circumferential bottom edge has an arcuate shape in cross-sectional side view with a radius r2.

13. The bottle of claim 12, wherein the radius r2: is between about 0.01 inches and about 0.3 inches; or is about 0.1 inches.

14. The bottle of claim 1, wherein the circumferential bottom edge disposed above the reference plane: at a distance of between about 0.01 inches and about 0.1 inches when the diaphragm is in the initial as-formed position; and/or, at a distance of between about 0.01 inches and about 0.2 inches when in the second position.

15. The bottle of claim 1, wherein the bottle is configured to increase in volume between the initial as-formed position and the second position of between about 3 percent and 7 percent.

16. The bottle of claim 1, wherein the inner wall is substantially straight in cross-sectional side view when in the second position.

17. The method of claim 2, wherein the arcuate shape of the inner wall is concave relative the reference plane in the initial as-formed position and/or the inner wall consists essentially of the concave arcuate shape in side cross section.

18. The method of claim 17, wherein at least a portion of the diaphragm extends below the reference plane in the second position.

19. The method of claim 17, wherein the hot-filled liquid is above ambient pressure prior to filling the portion of the bottle.

20. The method of claim 17, wherein the diaphragm moves from the second position at least to the initial as-formed position when the internal pressure relative the external pressure is below threshold value.

* * * * *